United States Patent
Gruber et al.

(10) Patent No.: US 7,356,997 B2
(45) Date of Patent: Apr. 15, 2008

(54) CHILLED WATER STORAGE FOR MILK COOLING PROCESS

(76) Inventors: Duane A. Gruber, 37-b Hadley Rd., Greenville, PA (US) 16125; Michael E. Gruber, 37-b Hadley Rd., Greenville, PA (US) 16125

(*) Notice: Subject to any disclaimer, the term of this patent is extended or adjusted under 35 U.S.C. 154(b) by 474 days.

(21) Appl. No.: 11/094,537

(22) Filed: Mar. 31, 2005

(65) Prior Publication Data

US 2005/0183428 A1    Aug. 25, 2005

Related U.S. Application Data

(60) Continuation-in-part of application No. 11/012,320, filed on Dec. 16, 2004, now Pat. No. 7,222,492, which is a division of application No. 10/446,821, filed on May 29, 2003, now Pat. No. 6,857,278.

(60) Provisional application No. 60/383,578, filed on May 29, 2002.

(51) Int. Cl.
*G05D 23/32* (2006.01)
*F25D 17/02* (2006.01)

(52) U.S. Cl. .................... 62/157; 62/185; 62/201; 62/434

(58) Field of Classification Search ............... 62/157, 62/185, 201, 430, 434
See application file for complete search history.

(56) References Cited

U.S. PATENT DOCUMENTS

| 2,024,639 | A |   | 12/1935 | Greene |
|---|---|---|---|---|
| 2,495,625 | A |   | 1/1950 | Bodinus |
| 3,120,110 | A |   | 2/1964 | Russell |
| 3,271,968 | A |   | 9/1966 | Gunther |
| 4,130,996 | A |   | 12/1978 | Sult |
| 4,242,872 | A |   | 1/1981 | Shaw |
| 4,280,335 | A |   | 7/1981 | Perez et al. |
| 4,351,271 | A |   | 9/1982 | Mueller et al. |
| 4,364,242 | A | * | 12/1982 | Smith ............................ 62/99 |
| 4,540,501 | A |   | 9/1985 | Ternes et al. |
| 4,645,908 | A |   | 2/1987 | Jones |
| 4,730,461 | A |   | 3/1988 | Meckler |
| 4,739,624 | A |   | 4/1988 | Meckler |
| 4,753,080 | A |   | 6/1988 | Jones et al. |
| 4,815,527 | A |   | 3/1989 | Meckler |

(Continued)

FOREIGN PATENT DOCUMENTS

GB    2 046 073    11/1980

(Continued)

*Primary Examiner*—Marc Norman
(74) *Attorney, Agent, or Firm*—Richard C. Litman

(57) ABSTRACT

The chilled water storage for milk cooling process encompasses methods for chilling liquids during off peak hours for later consumption, including a method for cooling the interior of a building while conserving energy during peak demand hours, in which water is chilled in a water chiller during the off-peak electrical demand hours, then stored in an insulated tank until peak electrical demand hours. The stored cold water is then pumped through a heat exchanger connected to the ventilation system in the building to cool the air in the building. The water then passes into a second storage tank, where it is held until off-peak hours. A plurality of multi-directional valves automatically control the water flow through the system.

7 Claims, 3 Drawing Sheets

U.S. PATENT DOCUMENTS

| | | |
|---|---|---|
| 4,840,033 A | 6/1989 | Garland |
| 5,044,172 A | 9/1991 | Inoue et al. |
| 5,046,551 A | 9/1991 | Davis et al. |
| 5,168,724 A * | 12/1992 | Gilbertson et al. ........... 62/430 |
| 5,307,642 A | 5/1994 | Dean |
| 5,497,629 A | 3/1996 | Rafalovich et al. |
| 5,647,225 A | 7/1997 | Fischer et al. |
| 5,682,752 A | 11/1997 | Dean |
| 6,101,821 A | 8/2000 | Cates |
| 6,131,398 A | 10/2000 | Versteijnen |
| 6,185,483 B1 | 2/2001 | Drees |
| 6,216,469 B1 | 4/2001 | Miller |
| 6,431,403 B1 | 8/2002 | Davis |
| 6,575,234 B2 | 6/2003 | Nelson |
| 2002/0134541 A1 | 9/2002 | Nelson |

FOREIGN PATENT DOCUMENTS

| | | |
|---|---|---|
| WO | WO 89/04443 | 5/1989 |
| WO | WO 98/15787 | 4/1998 |

* cited by examiner

CHILLED WATER STORAGE FOR MILK COOLING PROCESS

CROSS-REFERENCE TO RELATED APPLICATIONS

This is a continuation-in-part of my prior application Ser. No. 11/012,320, filed Dec. 16, 2004 now U.S. Pat. No. 7,222,492, which is a division of application Ser. No. 10/446,821, filed May 29, 2003, now issued Feb. 22, 2005 as U.S. Pat. No. 6,857,278, which claims the benefit of U.S. Provisional Patent Application Ser. No. 60/383,578, filed May 29, 2002.

BACKGROUND OF THE INVENTION

1. Field of the Invention

The present invention relates to a cooling process for liquids, and specifically, a cooling process for liquids utilizing a coolant liquid that is chilled during off-peak electrical demand periods.

2. Description of the Related Art

Cow's milk as it comes from the cow has a temperature of over 90 degrees Fahrenheit. At this temperature, bacteria multiply with great rapidity. Thus, milking operations in most states are controlled by strict regulations, requiring for example, that bulk milk shall be cooled to 38-40 degrees Fahrenheit within two hours of milking. Consequently, in order to comply with state requirements pertaining to the cooling of milk, the majority of dairy farms operate costly refrigeration equipment on a 24-hour basis.

In order to avoid inefficient consumption of energy while cooling milk or other liquids, it would be advantageous for cooling processes to employ the use of thermal storage, whereby heat is extracted from a thermal reservoir during one time period and, during a different time period, the reservoir is used to extract heat from a different environment. In this manner, electricity usage is shifted from a peak demand period to an off-peak period. This shift assists commercial power generation companies to handle peak electricity usage, especially in major metropolitan areas where the peak power demand on the power generation of a utility on a very hot day can put a severe strain on the power generation system. Furthermore, shifting electricity usage to off-peak periods such as nighttime hours, allows significant cost savings to the consumer, as less expensive electricity is generally available at night and lower ambient temperatures allow for more efficient heat rejection.

Pre-cooling the liquid prior to directing it into the storage tank is another method by which energy can be conserved. Pre-cooling liquids minimizes the rise in temperature associated with mixing high temperature liquid with already cooled liquid that is in the storage tanks. As such, instead of placing a liquid directly into a storage tank, it is more energy efficient to pre-cool the liquid to a temperature approaching that of the storage temperature before directing it into the storage tank in order to refrigerate what may be a large quantity of liquid over a smaller and lower temperature range, rather than cooling the same quantity of liquid directly in the storage tank over a large temperature range.

Related art cooling processes have failed to achieve a simplified cooling process which fully realizes the potential for increased energy efficiency by neglecting to incorporate use of thermal storage, a pre-cooling step, or an effective combination of both processes.

U.S. Pat. No. 2,024,639, issued Dec. 17, 1935 to O. Greene, discloses cooling raw milk in a process wherein the raw milk is cooled by passing it as a thin film over the walls of a storage tank encircled by a refrigerant-filled jacket. As the storage tank for the milk also serves as the cooling unit, this cooling process relies heavily on constant refrigeration and is subject to the drawbacks mentioned above associated with cooling systems which lack a separate pre-cooling phase before the milk is directed into the storage tank.

U.S. Pat. No. 2,495,625, issued Jan. 24, 1950 to W. Bodinus, discloses a cooling process for wort involving a plurality of steps, including using water for cooling wort in the pre-cooling and intermediate stages and then for condensing refrigerant used in a third cooling stage. This process, while incorporating a pre-cooling phase, remains significantly dependent on a continuously operated refrigeration machine.

International Patent No. WO 98/15787, published Apr. 16, 1998, discloses a cooling system particularly, but not exclusively, for milk, which is transferred from a milking station to a vat along a first flow path and then exits the vat along a second flow path in which the milk is cooled before reentering the same vat. In this process, pre-cooling of milk is not employed and constant operation of a refrigeration unit is required.

U.S. Pat. No. 4,130,996, issued Dec. 26, 1978 to G. M. Sult, describes a bulk-milk cooling reservoir with an evaporation unit inside the reservoir and a condenser for recycling water to the evaporation unit. U.S. Patent No. 4, 351,271, issued Sep. 28, 1982 to Mueller et al., discloses a refrigerated receiver for an automatic milking system having an improved plate type heat exchanger inside the receiver for pre-cooling the milk. U.K. Patent No. 2,046,073, published Nov. 12, 1980, teaches a milk pasteurization apparatus and method, including heating and cooling the milk.

In addition to cooling milk and other liquids, an off-peak cooling system can be used in cooling any fluid. Air conditioning systems often use heat exchangers to transfer heat from the ambient air in a building to some other moving fluid, whether air, water or refrigerant. Before entering the heat exchanger, this moving refrigerant fluid must be cooler then the ambient building air in order for heat to transfer from the ambient air to the refrigerant. This heat transfer then raises the temperature of the refrigerant after is passes through the heat exchanger. When using a closed loop system, where the refrigerant liquid is recycled through the heat exchanger repeatedly, the refrigerant must be re-cooled in each cycle before entering the heat exchanger.

The re-cooling of the refrigerant requires a great deal of energy consumption. Air conditioning systems are generally run during the hottest hours of the day, which coincides with the peak energy demand hours of most electrical power plants.

Again, this peak energy use has two typical consequences. First, power companies often charge more for energy used during peak hours, raising the cost of air-conditioning buildings during these hours. Second, heavy air conditioning use over a highly populated area during peak hours can require more energy than some power plants are able to provide, creating a brown-out and shutting down the electrical supply for all users whose electricity is supplied by the overworked power plant.

A need exists for an air conditioning system that allows for the cooling of the recycled refrigerant to occur only during off-peak electrical demand hours. None of the above inventions and patents, taken either singly or in combination, is seen to describe the instant invention as claimed.

Thus, a chilled water storage tank system for an air conditioning process solving the aforementioned problems is desired.

SUMMARY OF THE INVENTION

A process for cooling a liquid according to the present invention is as follows. During off-peak electrical demand periods, such as nighttime, a coolant liquid is directed by a first conduit through a chiller. The coolant liquid is cooled in the chiller and then directed from the chiller into a first insulated storage vessel until peak electrical demand periods begin. During peak electrical demand periods, the chilled coolant liquid flows from the insulated storage vessel to a flat plate heat exchanger where a flow of liquid to be cooled, such as milk, entering through a second conduit is cooled. After cooling, the liquid (e.g., milk) exiting the heat exchanger is directed to a second insulated storage vessel where little or no further cooling of the cooling liquid will be necessary during peak electrical demand periods. Spent coolant liquid exiting the flat plate heat exchanger is directed by a waste line to a depository for other use.

A preferred embodiment of the present invention is a process for cooling milk during peak electrical demand periods as follows. During off-peak electrical demand periods, water, typically at a temperature of about 55° F., is directed from a water source, preferably a water well, by a first conduit through a chiller. The water is cooled in the chiller to approximately 36° F. and then directed from the chiller into an insulated water storage tank. During peak electrical demand periods, chilled well water flows from the insulated water storage tank to a flat plate heat exchanger where a flow of raw milk from a milking parlor, which is typically at a temperature of about 101° F., simultaneously enters the flat plate heat exchanger through a second conduit. The milk is cooled to a temperature of about 38-42° F. The cooled milk exiting the heat exchanger is directed to insulated bulk milk storage tanks or refrigerated milk tanker trucks, where it is stored at a temperature of about 38° F. As this is the desired temperature for storing milk, little or no further cooling of the milk will be necessary during peak electrical demand periods. Waste water exiting the heat exchanger, at a temperature typically of about 72° F., is directed by a waste line to either a cattle watering station, or a cattle barn where the water may be used by mistifiers to cool cattle.

The present invention also extends to a chilled water storage for air conditioning process, which is a method for cooling the interior of a building while conserving energy during peak demand hours. The system chills water in a water chiller during the off-peak electrical demand hours, and then stores the water in an insulated tank until peak electrical demand hours. Because the water chiller uses the bulk of the electrical energy required for the system, running the chiller only during the off-peak hours saves money and reduces the peak hours burden for power companies.

The water is entered into the system via a connection to the municipal water supply. A valve can be used to allow water to enter the system from this connection if the water level in the closed loop system becomes lower than necessary. A back-flow preventer is also installed to prevent water in the closed loop system from exiting back into the municipal water supply. The water entering in this make-up connection can be directed through the chiller directly, or can be stored in a warm water storage tank until it is needed for use.

The water from either the make-up connection or from the warm water storage tank is directed through the water chiller and into a cold water storage tank during off-peak electrical demand hours. When drawing from the warm water storage tank, the water passes through a warm water line into a four-way valve, and then into the chiller line. The chiller line includes a first three-way valve that connects into a heat exchanger connecting line coming from the air conditioning system heat exchanger. After passing through the water chiller, the now-cooled water passes through the pump that provides the pressure that forces the water throughout the system. The cooled water is directed through a second three-way valve, which forces the cooled water into a return line that takes the water back into the four-way valve. The cooled water enters the four-way valve and is then directed through a cold water line to the cold water storage tank.

The cold water storage tank is insulated to prevent the water stored in it from rising in temperature. As the cooled water fills into the cold water storage tank, a switch near the top of the tank is activated. This tells the system that the tank is full, and the valves are then opened or closed automatically as needed to stop the flow of chilled water into the tank.

When peak electrical demand hours begin, the stored cold water is pumped through a heat exchanger connected to the ventilation system in the building to cool the air in the building. The cooled water passes from the cold water storage tank, through the cold water line and through the four-way valve into the chiller line. The cooled water passes through the water chiller, but at this point the water chiller need not be used to chill the water below the temperature needed for proper functioning of the heat exchanger.

After then passing through the pump, the chilled water now is directed by the second three-way valve into the heat exchanger line. The chilled water passes through the heat exchanger coils, allowing heat to transfer from the warmer air moving through the ventilation system. This causes the temperature of the water to rise as it exits the heat exchanger.

When the water leaves the heat exchanger, it is then directed by a third three-way valve back into the return line. The water passes through the return line to the four-way valve and then into the warm water line. The water then passes into the warm water storage tank, where it is held until off-peak hours. As the water fills into the warm water storage tank, a switch near the top of the tank is activated. This tells the system that the tank is full, and the valves are then opened or closed automatically as needed to stop the flow of water into the tank.

Both the warm water storage tank and the cold water storage tank also have low level switches near the bottom of the tank. These low level switches signal the system that the tanks are substantially empty, and the valves are then opened or closed automatically as needed to stop the flow of water out of the tanks.

Accordingly, it is a principal object of this invention to provide a simplified process for cooling liquids during peak electrical demand periods with a coolant liquid that is chilled during off-peak electrical demand periods.

It is another object of this invention to provide a simplified process for cooling liquids so that the liquids are significantly cooled with little or no use of refrigeration units during peak electrical demand periods.

It is a further object of the invention to ease strains on a state's electrical power grid system in an economical and environmentally safe way.

Still another object of the invention is to increase milk production without adding refrigeration capacity.

Additionally, it is an object of the invention to conserve water by recycling water from a milk cooling apparatus for cattle watering and as a water source for mistifiers for cooling cattle.

It is an object of the invention to provide improved elements and arrangements thereof in a process for the purposes described which is inexpensive, dependable and fully effective in accomplishing its intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
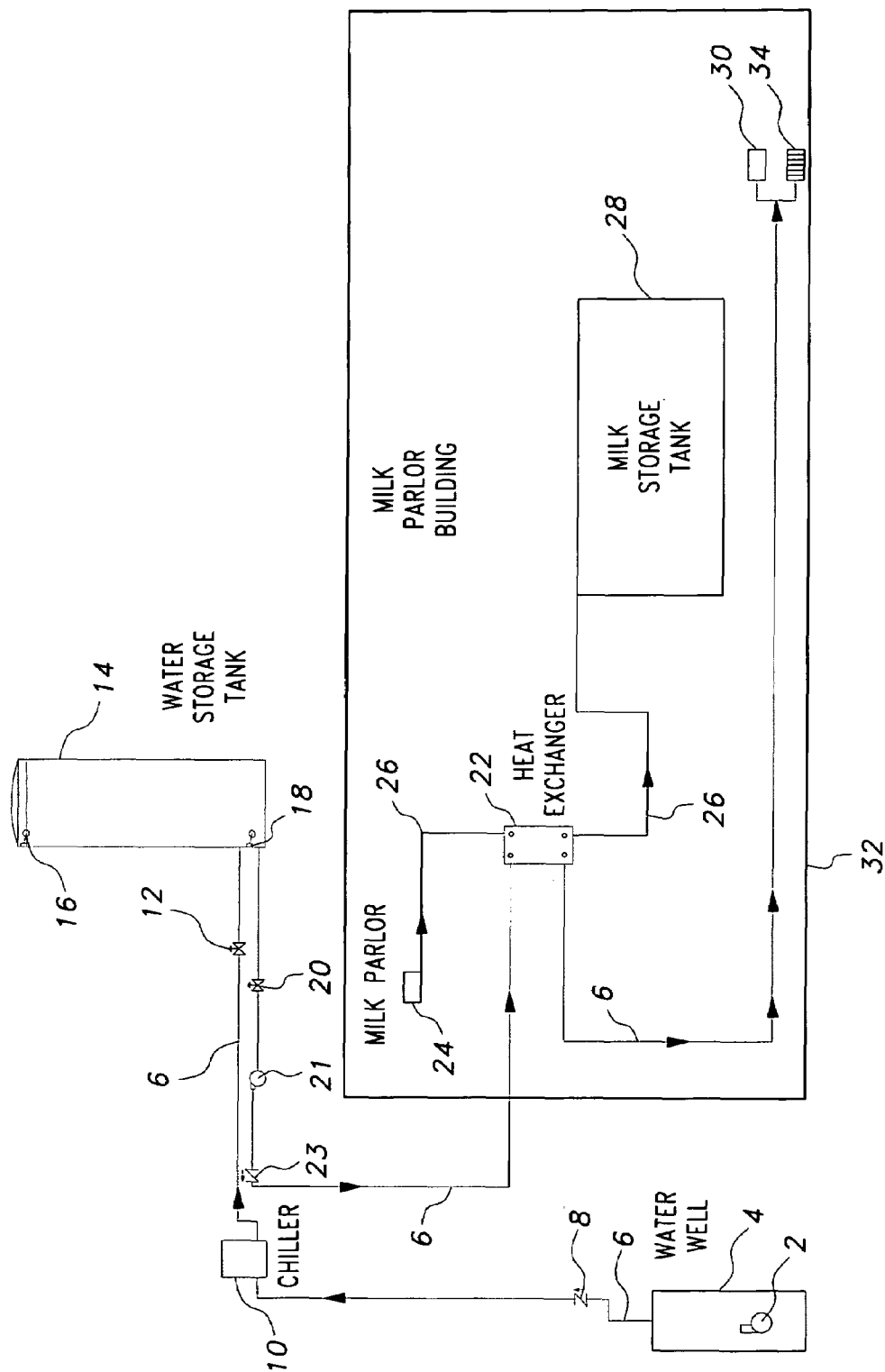
FIG. 1 is a schematic block diagram depicting a process for cooling milk according to the present invention.

The present invention relates to a process for cooling liquids, wherein a coolant liquid is chilled during off-peak electrical demand periods, and, in the subsequent peak electrical demand periods, the chilled coolant is used to cool a liquid, e.g., milk, so that little or no consumption of energy will be required to further cool the liquid during peak electrical demand periods. A preferred embodiment for the process of the present invention is a process for cooling milk as depicted in FIG. 1. During off-peak electrical demand periods, water obtained from a water well 4, typically at a temperature of about 55° F., is advanced by a pump 2 through a first conduit 6 to an air cooled water chiller 10 where the water is then chilled to a temperature of about 36° F. The flow of water from the water well 4 is reinforced by a conventional check valve 8 which ensures that there is no backflow of water.

The first conduit 6 is preferably process piping for food preparation, made from high grade stainless steel, having a grade of 316, 304, or 304LL.

The water from the chiller 10 flows through the conduit 6 and advances through control valves 12 to at least one insulated water storage tank 14. More than one storage tank may be used if attached in a parallel fashion, to achieve the same effect. The storage tank 14 is preferably a potable water storage tank that is non-stratified. The storage tank 14 is insulated to limit heat gain so that water in the storage tank does not rise over 0.5° F. over a period of eight hours. The storage tank 14 contains a high-level switch 16 near its top end, and a low level switch 18 near its bottom end. The first set of control valves 12 and a second set of control valves 20 are operated by an automated control system to control the flow of water in and out of the storage tank 14. The first set of control valves 12 is turned on during off-peak electrical demand periods, while the water fills the storage tank 14. The flow of water into the storage tank continues until the water in the storage tank 14 reaches a high-level switch 16, at which point the automated control system shuts off the first set of control valves 1) and the chiller 10, and the chilled water in the storage tank is stored in the storage tank 14 at a temperature of about 36° F. until peak electrical demand periods begin.

Once the off-peak electrical demand periods have ended, the automated control system opens the second set of control valves 20 which allows chilled water from the storage tank 14 to flow through the first conduit 6 downstream from storage tank 14. The water is then advanced by a second pump 21 through a second check valve 23 and towards a flat plate heat exchanger 22 contained within a milking parlor building 32. Simultaneously through a second conduit 26, a flow of raw milk from the milking parlor 24 also enters the flat plate heat exchanger 22 at a temperature of about 101° F. 26, where the raw milk is cooled to a temperature of about 36-42° F. The flow of milk is advanced by a vacuum system conventionally used in automated milking systems. The second conduit 26 is preferably process piping for food preparation, made from high grade stainless steel, having a grade of 316, 304, or 304LL. While the flat plate heat exchanger 22 can be any conventional stainless steel flat plate heat exchanger designed for food preparation, one having type 304 stainless steel end frames and stainless steel compressor bolts is preferred.

The milk and water exit the flat plate heat exchanger 22 simultaneously through separate conduits. Milk exiting the flat plate heat exchanger 22 through the second conduit 26 has a temperature of about 36-42° F., while the waste water exiting the flat plate heat exchanger through the first conduit 6 has a temperature of about 72° F. The waste water advances towards a cattle watering site 30 or to cattle barns 34, where it may be used by mistifiers to cool cows during warm weather. The milk advances through the second conduit 26 towards insulated storage vessels 28 where it is stored at the desired temperature of about 38° F. The insulated storage vessels can either be bulk storage tanks on the dairy farm or self-contained refrigerated milk tanker trucks.

EXAMPLE

The following example is illustrative of a possible application of the process of the present invention in a typical dairy farm and is not intended to be a limitation thereon. Table 1 depicts technical data for a hypothetical dairy farm. Table 2 depicts energy consumption in the dairy farm, which is based on a typical Time of Use (TOU) Rate Schedule. Table 3 depicts calculated energy savings which should be achievable using the present invention for the dairy farm based on the data provided in Tables 1 and 2.

TABLE 1

| | |
|---|---|
| Approximate # of Cattle Milked per Day | 780-790 |
| Approximate Total Milk Production per Day | 6,960 gal/day |
| Milking Period/Cycle | 24 hours |
| Milk Temperature Leaving Cow | 101 deg/F. |
| Milk Bulk Storage Temperature | 38 deg/F. |
| Process Cooling Delta Temperature | 63 deg/F. |
| Allowable Time to Achieve Process Delta | 4-5 minutes |
| Milk Main Process Cooling Equipment Capacity | 30 ton DX refrigeration |
| Volume of Chilled Water to cool Gallon of Milk | 1.5 gal Water: 1 gal Milk |

TABLE 2

|  | Energy Consumption (kWh/yr.) | Energy Cost (kW/h) | Energy Cost (yr) |
|---|---|---|---|
| On-Peak | 28,350 | $0.172514 | $4,891 |
| Shoulder | 43,200 | $0.081214 | $3,508 |
| Off-Peak | 220,770 | $0.038544 | $8,509 |
| Total |  |  | $16,909 |

TABLE 3

|  | Energy Consumption (kWh/yr) | Energy Cost (kWh) | Energy Cost (yr) |
|---|---|---|---|
| On-Peak | shifted | shifted | — |
| Shoulder | shifted | shifted | — |
| Off-Peak | 284,142 | $0.038544 | $10,952 |
| Total |  |  | $5,957 |
| Savings (yr) |  |  |  |

Although its primary use is for cooling milk, the present invention may be used for cooling other liquids, including, but not limited to, dairy products, beverage products such as beer, juice products, noncarbonated soda water, as well as pre-made tea and coffee beverages. Furthermore, in addition to well water, the coolant liquid employed in the present invention may include but is not limited to water obtained from one of many sources, including but not limited to streams, reservoirs, lakes, and rivers, as well as mixtures of water and glycol.

The present invention also extends to a chilled water storage for air conditioning process, which is a method for cooling the interior of a building while conserving energy during peak demand hours. The system, designated generally as 100 in FIGS. 2 and 3, chills water in a water chiller 110 during the off-peak electrical demand hours, and then stores the water in an insulated cold water storage tank 120 until peak electrical demand hours. Because the water chiller 110 uses the bulk of the electrical energy required for the system 100, running the chiller 110 only during the off-peak hours saves money and reduces the peak hours burden for power companies.

Figure 2:
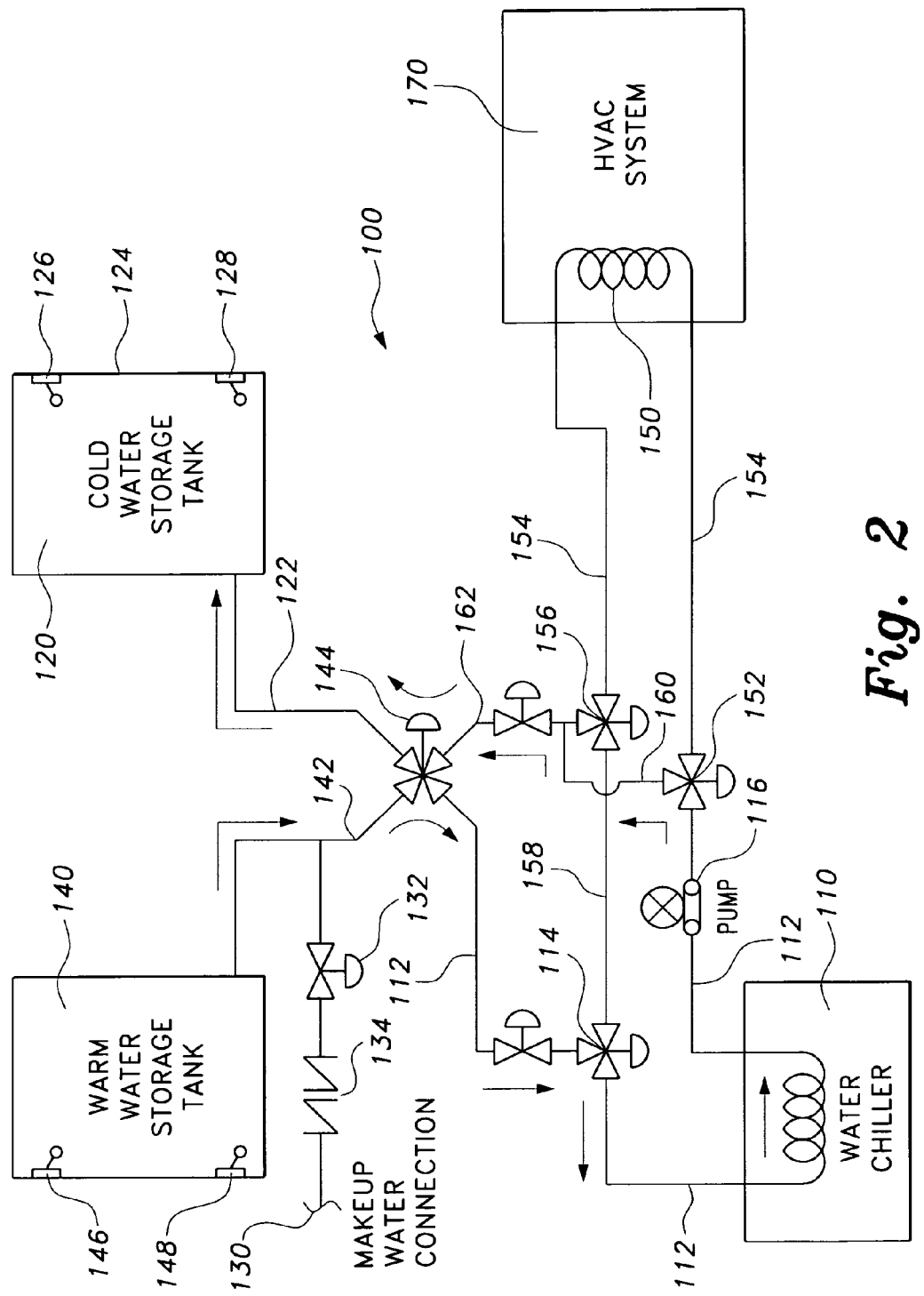
FIG. 2 is a flow diagram for chilled water charging flow during off-peak hours in an air conditioning system using a chilled water storage tank.
Figure 3:
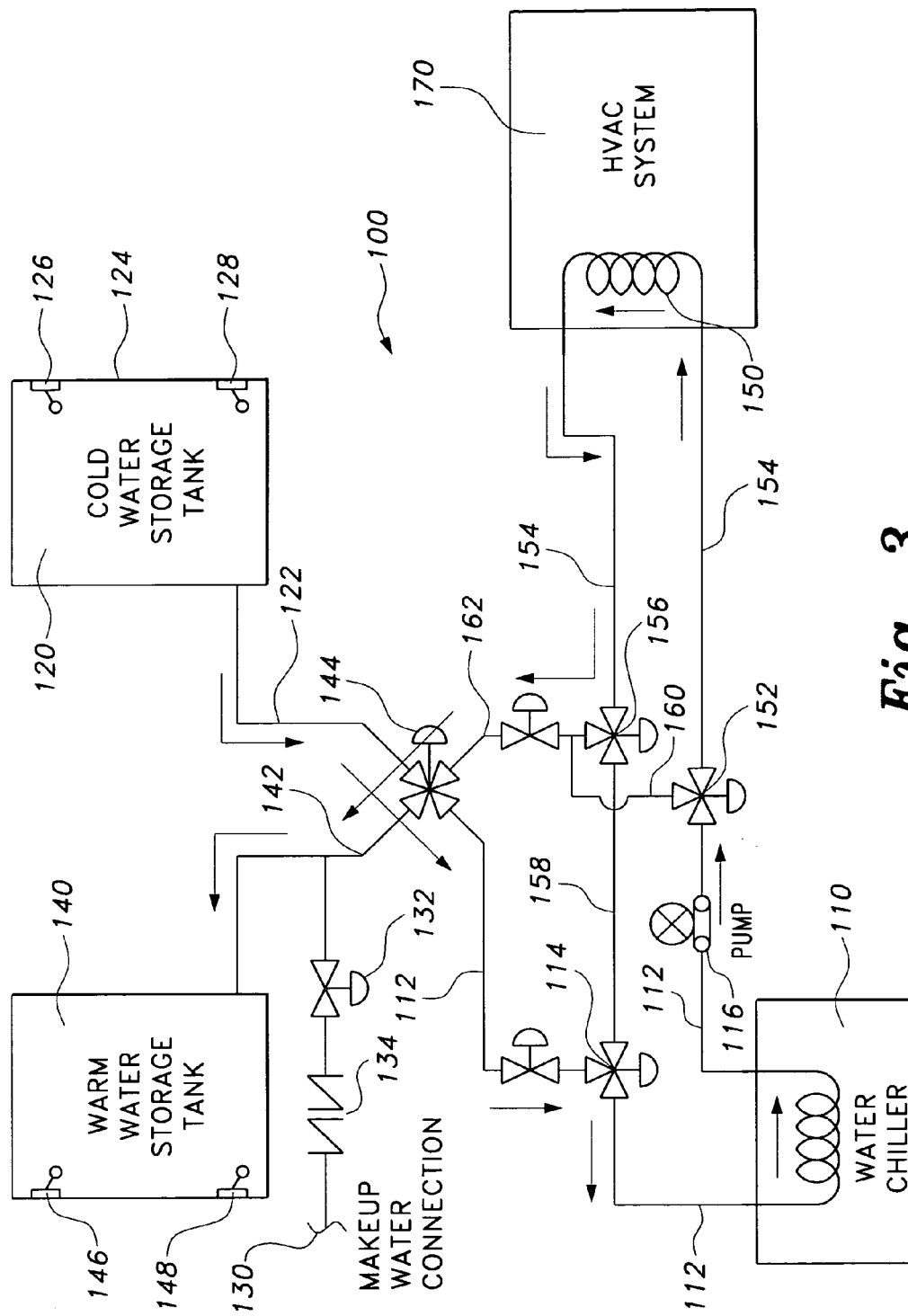
FIG. 3 is a flow diagram for cold water-discharge flow for an air conditioning system using a chilled water storage tank.

The water is entered into the system 100 via a connection 130 to the municipal water supply, as shown in FIGS. 2 and 3. A valve 132 can be used to allow water to enter the system 100 from this make-up water connection 130 if the water level in the closed loop system 100 becomes lower than necessary. A back-flow preventer 134 is also installed in this connection 130 to prevent water in the closed loop system 100 from exiting back into the municipal water supply. The water entering in this make-up connection 130 can be directed through the chiller 110 directly, or can be stored in a warm water storage tank 140 until it is needed for use.

The water from either the make-up connection 130 or from the warm water storage tank 140 is directed through the water chiller 110 and into the cold water storage tank 120 during off-peak electrical demand hours, as shown in FIG. 2. When drawing from the warm water storage tank 140, the water passes through a warm water line 142 into a four-way valve 144, and then into the chiller line 112. The chiller line 112 includes a first three-way valve 114 that connects into a heat exchanger connecting line 158 coming from the air conditioning system heat exchanger 150. After passing through the water chiller 110, the now-cooled water passes through the pump 116 that provides the pressure that forces the water throughout the system 100. The cooled water is directed through a second three-way valve 152, which forces the cooled water into a return line connector 160 that takes the water into the return line 162, and then back into the four-way valve 144. The cooled water enters the four-way valve 144 and is then directed through a cold water line 122 to the cold water storage tank 120.

The cold water storage tank 120 has insulated walls 124 to prevent the water stored in it from rising in temperature. As the cooled water fills into the cold water storage tank 120, a switch 126 near the top of the tank 120 is activated. This tells the system 100 that the tank 120 is full, and the valves are then opened or closed automatically as needed to stop the flow of chilled water into the tank 120.

When peak electrical demand hours begin, the stored cold water is pumped through a heat exchanger 150 connected to the ventilation system 170 in the building to cool the air in the building, as shown in FIG. 3. The cooled water passes from the cold water storage tank 120, through the cold water line 122 and through the four-way valve 144 into the chiller line 112. The cooled water passes through the water chiller 110, but at this point the water chiller 110 need not be used to chill the water below the temperature needed for proper functioning of the heat exchanger 150.

After then passing through the pump 116, the chilled water now is directed by the second three-way valve 152 into the heat exchanger line 154. The chilled water passes through the heat exchanger 150, allowing heat to transfer from the warmer air moving through the ventilation system 170. This causes the temperature of the water to rise as it exits the heat exchanger 150.

When the water leaves the heat exchanger 150, it is then directed by a third three-way valve back 156 into the return line 162. The water passes through the return line 162 to the four-way valve 144 and then into the warm water line 142. The water then passes into the warm water storage tank 140, where it is held until off-peak hours. As the water fills into the warm water storage tank 140, a switch 146 near the top of the tank 140 is activated. This tells the system 100 that the tank 140 is full, and the valves are then opened or closed automatically as needed to stop the flow of water into the tank 140.

Both the warm water storage tank 140 and the cold water storage tank 120 also have low level switches near the bottom of the tank. The warm water storage tank low level switch 148 signals the system 100 that the warm water storage tank 140 is substantially empty, and the cold water storage tank low level switch 128 signals the system 100 that the cold water storage tank 120 is substantially empty. When these low level switches are activated, the valves are then opened or closed automatically as needed to stop the flow of water out of the tanks.

It is to be understood that the present invention is not limited to the embodiments described above, but encompasses any and all embodiments within the scope of the following claims.

We claim:

1. A method for cooling the interior of a building while conserving energy during peak demand hours, comprising the steps of:

chilling water during off-peak electrical demand hours by passing the water through a first conduit, said first conduit comprises a warm water line, a four-way valve, a chiller line, and a first three-way valve, so that during the off-peak electrical demand hours, water passes from a warm water storage tank to said warm water line, from said warm water line through said four-way valve to said chiller line, and through said first three-way valve to a water chiller;

passing the chilled water through a second conduit from the water chiller to a cold water storage tank;

releasing the chilled water from said cold water storage tank during peak electrical demand hours and passing the chilled water, via a third conduit, through a heat exchanger, wherein heat is transferred from ambient air in the building passing through a connected air duct system to the chilled water, so that the temperature of the ambient air in the building is lowered and the temperature of the chilled water is raised; and passing the water through a fourth conduit to a warm water storage tank, wherein the water is stored to be sent through the water chiller during off-peak electrical demand hours.

2. An air conditioning system for cooling the interior of a building while conserving energy during peak demand hours, comprising:

a warm water storage tank;

a water chiller for cooling water passing therethrough;

a cold water storage tank;

a heat exchanger for transferring heat from air passing through an air duct system to water passing through said heat exchanger;

a first conduit connecting said warm water storage tank to said water chiller for passing water from said warm water storage tank to said water chiller, wherein said first conduit further comprises a warm water line, a four-way valve, a chiller line, and a first three-way valve, so that during the off-peak electrical demand hours, water passes from said warm water storage tank to said warm water line, from said warm water line through said four-way valve to said chiller line, and through said first three-way valve to said water chiler;

a second conduit connecting said water chiller to said cold water storage tank for passing water from said water chiller to said cold water storage tank;

a third conduit connecting said cold water storage tank to said heat exchanger for passing water from said cold water storage tank to said heat exchanger; and a fourth conduit connecting said heat exchanger to said warm water storage tank for passing water from said heat exchanger to said warm water storage tank.

3. The air conditioning system according to claim 2, wherein said warm water storage tank further comprises a first low level switch and a first high level switch, said first high level switch indicating when said warm water storage tank is substantially full and said first low level switch indicating when said warm water storage tank is substantially empty.

4. The air conditioning system according to claim 2, wherein said cold water storage tank further comprises an insulating cover disposed about the tank, a second low level switch and a second high level switch, said second high level switch indicating when said cold water storage tank is substantially full and said second low level switch indicating when said cold water storage tank is substantially empty.

5. The air conditioning system according to claim 2, wherein said second conduit further comprises a chiller line, a pump, a second three-way valve, a return line connector, a return line, and a cold water line, so that during the off-peak electrical demand hours, water passes from said water chiller to said chiller line, through said pump and said second three-way valve to said return line connector, through said return line connector to said return line, from said return line through said four-way valve to said cold water line, and through said cold water line to said cold water storage tank.

6. The air conditioning system according to claim 5, wherein said third conduit further comprises a heat exchanger line, so that during peak electrical demand hours, water passes from said cold water storage tank to said heat exchanger by passing through said cold water line, said four way valve, said chiller line, said first three-way valve, said water chiller, said pump, said second three-way valve, and said heat exchanger line in sequence.

7. The air conditioning system according to claim 6, wherein said fourth conduit further comprises a heat exchanger line and a third three-way valve, so that during peak electrical demand hours, water passes from said heat exchanger to said warm water storage tank by passing through said heat exchanger line, said third three-way valve, said return line, said four-way valve, and said warm water line in sequence.

* * * * *